(12) United States Patent
Bimbaud

(10) Patent No.: US 6,963,496 B2
(45) Date of Patent: Nov. 8, 2005

(54) VOLTAGE CONVERTER WITH A SELF-OSCILLATING CONTROL CIRCUIT

(75) Inventor: Igor Bimbaud, Saint Cyr sur Loire (FR)

(73) Assignee: STMicroelectronics S.A., Montrouge (FR)

( * ) Notice: Subject to any disclaimer, the term of this patent is extended or adjusted under 35 U.S.C. 154(b) by 247 days.

(21) Appl. No.: 10/257,184

(22) PCT Filed: Oct. 23, 2001

(86) PCT No.: PCT/FR01/03295

§ 371 (c)(1),
(2), (4) Date: Feb. 10, 2003

(87) PCT Pub. No.: WO02/35693

PCT Pub. Date: May 2, 2002

(65) Prior Publication Data

US 2003/0174520 A1 Sep. 18, 2003

(30) Foreign Application Priority Data

Oct. 24, 2000 (FR) .............................. 00 13625

(51) Int. Cl.⁷ ............................................. H02M 3/335
(52) U.S. Cl. ................................ 363/21.16; 363/21.08; 363/97
(58) Field of Search ........................ 363/19, 21.08, 363/21.12, 21.16, 97, 131

(56) References Cited

U.S. PATENT DOCUMENTS

| | | | | |
|---|---|---|---|---|
| 4,754,386 A | * | 6/1988 | De Weerd ................. | 363/21.08 |
| 5,717,578 A | * | 2/1998 | Afzal ....................... | 363/21.13 |
| 5,831,837 A | * | 11/1998 | Coyne et al. ............. | 363/21.08 |
| 6,118,675 A | * | 9/2000 | Lionetto et al. .......... | 363/21.13 |
| 6,134,123 A | * | 10/2000 | Yamada .................... | 363/21.13 |

* cited by examiner

Primary Examiner—Michael Sherry
Assistant Examiner—Gary L. Laxton
(74) Attorney, Agent, or Firm—Robert Iannucci

(57) ABSTRACT

A voltage converter including a transformer having a primary winding connected in series with a switch for cutting-up a supply voltage and having a secondary winding associated with a capacitor providing a D.C. low voltage, and a self-oscillating control circuit of the switch for detecting the end of the demagnetization of an auxiliary winding of the transformer, to turn the switch on, and for detecting the current in the on-state switch to turn it off when this current reaches a reference point. The reference point is made variable according to the voltage across the auxiliary winding.

17 Claims, 3 Drawing Sheets

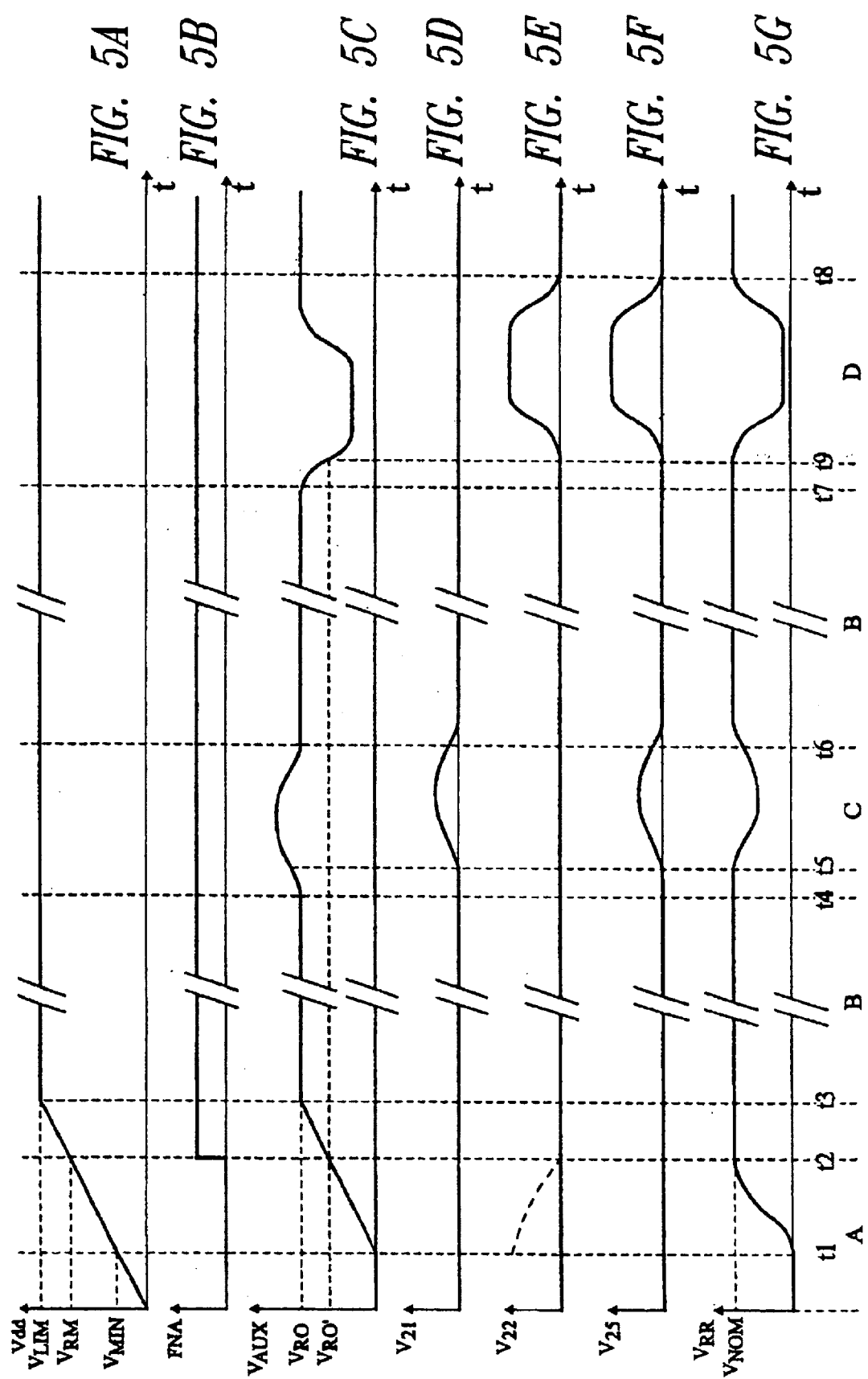

VOLTAGE CONVERTER WITH A SELF-OSCILLATING CONTROL CIRCUIT

BACKGROUND OF THE INVENTION

1. Field of the Invention

The present invention relates to the field of voltage converters of low voltage switched-mode power supply type. The present invention more specifically relates to isolated power supplies, that is, power supplies having no common point between the input voltage (for example, the A.C. supply system) and the regulated D.C. output voltage. The isolation is obtained by means of a transformer having a primary winding associated with a switch and a secondary winding associated with a diode and with a capacitor providing the output voltage. The present invention more specifically relates to so-called self-oscillating converters, in which the switch is controlled in frequency modulation, as opposed to converters having their switch controlled in pulse-width modulation.

2. Description of the Related Art

FIG. 1 shows a conventional example of a switched-mode power supply of the type to which the present invention applies. Two input terminals P, N receive an A.C. voltage $V_{ac}$, for example, the mains voltage. Voltage $V_{ac}$ is rectified, for example by a fullwave rectification by means of a diode bridge 1. The A.C. input terminals of bridge 1 are connected to terminals P and N. Rectified output terminals 2, 3 of bridge 1 provide a voltage which is generally smoothed by means of a capacitor C1 connected between terminals 2 and 3. Terminals 2 and 3 form the input terminals of the actual switched-mode power supply.

The converter of FIG. 1 is a so-called "flyback" converter in which a transformer 4 with inverted phase points has its primary winding 5 connected in series with a switch 6 between terminals 2 and 3. The phase point of winding 5 is connected to a terminal of switch 6 and the other terminal of the winding is connected to terminal 2. A secondary winding 7 of transformer 4 is associated with a capacitor C2 across terminals 8, 9 of which D.C. output voltage $V_{out}$ is provided. The phase point of winding 7 is connected to terminal 8 by a diode D2, the cathode of diode D2 being connected to terminal 8. The other terminal of winding 7 is connected to terminal 9.

When switch 6 is closed, the phase point of winding 7 is at a negative potential. Diode D2 thus is blocked and a current is accumulated in primary winding 5. Upon turning-off of switch 6, the phase points of windings 5 and 7 both become positive. Diode D2 is forward biased. Capacitor C2 is then charged with the power transferred to secondary winding 7.

Switch 6 is controlled by a circuit 10 (CTRL) having the function of cyclically turning off and turning on switch 6. In a self-oscillating converter, the turning-off of switch 6 is caused by comparison of the current flowing through this switch when on to a reference value. For this purpose, a detector 11 (for example, a resistor) in series with switch 6 is generally used, the result of its measurement being provided to circuit 10. To turn switch 6 on, the demagnetization of an auxiliary winding 7' of transformer 4 is monitored. Auxiliary winding 7' is in direct phase relation with secondary winding 7. Accordingly, a detection of the end of demagnetization of winding 7' corresponds, as a first approximation, to a detection of the end of demagnetization of winding 7. The phase point of winding 7' is connected to an input terminal of circuit 10 while the opposite terminal of the winding is connected to ground 3. To detect the end of demagnetization, the voltage across auxiliary winding 7' is monitored by means of circuit 10. The demagnetization is considered as finished when this voltage falls under a predetermined voltage threshold. Switch 6 is then turned on. It should be reminded that, since the phase points of the primary and auxiliary windings are inverted, the voltage across auxiliary winding 7' is negative out of these demagnetization periods (when switch 6 is on).

Generally, auxiliary winding 7' is also used to provide a local supply voltage to control circuit 10. For this purpose, a local supply capacitor C3 is connected across the supply terminals of circuit 10. A positive electrode 12 of the capacitor is connected, by a diode D3, to the phase point of winding 7', the anode of diode D3 being connected to the phase point. The other electrode of capacitor C3 is connected to ground 3.

FIG. 2 shows a conventional example of a self-oscillating control circuit 10 of a voltage converter. Switch 6 is generally formed of a MOS transistor having its drain connected to primary winding 5 and its source, at node 37, connected by a resistor R11 to ground 3. Resistor R11 has the function of a current-to-voltage converter for an input terminal of a first comparator 13 of circuit 10. Comparator 13 has the function of comparing the current in switch 6 with a reference value $V_{RI}$ provided to the other terminal of comparator 13. Reference voltage $V_{RI}$ of comparator 13 is chosen according to the desired output voltage $V_{out}$ and to the transformation ratio between the primary and secondary windings. Voltage $V_{RI}$ conditions the converter power, which is proportional to the value of the inductances of transistor 4 and to the square of the current in primary winding 5 when switch 6 is on. The output of comparator 13 is sent onto the reset input (R) of an RS flip-flop 15 or the like, the non-inverted Q output of which provides the control signal of switch 6. The Q output of the flip-flop is generally applied to the gate of transistor 6 via a driver 16. Set input S of flip-flop 15 is connected to the output of a second comparator 17 having the function of detecting the end of demagnetization of auxiliary winding 7'. An input of comparator 17 receives a voltage reference $V_{RV}$ from an element 18. Value $V_{RV}$ is chosen to correspond to a voltage threshold under which the demagnetization is considered as finished. Ideally, voltage $V_{RV}$ is zero. The other input of comparator 17 is connected, by a diode D4, to the phase point of winding 7', the anode of diode D4 being connected to this phase point. Given the connections of comparators 13 and 17 (the positive input of comparator 13 is connected to node 37 and the negative input of comparator 17 is connected to diode D4), the output of comparator 13 switches high when the current in switch 6, multiplied by the value of resistance R11, exceeds voltage $V_{RI}$, while comparator 17 switches high when the voltage across auxiliary winding 7' (neglecting the voltage drop in diode D4) becomes smaller than voltage $V_{RV}$.

As soon as comparator 13 outputs a high state, this state holds the priority at the level of flip-flop 15, which provides a low output level. This causes the turning-off of switch 6, and thus a demagnetization beginning. As soon as the demagnetization begins, the output of comparator 13 switches low, switch 6 being off. When the end of demagnetization is detected by comparator 17, its output switches high. With the output of comparator 17 high and comparator 13 low, the non-inverted Q output of the flip-flop switches high. This turns on switch 6. This operation carries on cyclically.

It can be seen that the frequency of the turn-on cycles of switch 6 is variable and that the switching edges are directly caused by the detections performed by comparators 13 and 17. This is why this circuit is called a self-oscillating circuit. Since the turning-on of switch 6 can only occur after demagnetization, such a converter only operates in a so-called "discontinuous" mode, as opposed to converters operating in "continuous" mode, where the demagnetization may be incomplete at each switching cycle.

In FIG. 2, the rest of the switched-mode converter components have only been partially shown. The presence of a resistor R1 connecting local supply line 12 to terminal 2 has however been illustrated. The function of resistor R1 is to enable charge of capacitor C3, to power circuit 10 at the system starting. To illustrate the powering of circuit 10 from the voltage across capacitor C3, all elements (voltage references 14 and 18, comparators 13 and 17, flip-flop 15 and driver 16) have been shown with their respective supply terminals connected to terminals 12 and 3.

As compared to a switched-mode power supply operating in pulse-width modulation (PWM), a self-oscillating circuit has the advantage of a low cost. In particular, it is not necessary to provide an oscillator generating a sawtooth-shaped signal, with a modulation of its pulsewidth.

The inputs of flip-flop 15 may be associated with trigger circuits. Further, a delay element may be provided at the output of comparator 17, according to its responsiveness. A low responsiveness is then compensated for by increasing detection threshold $V_{RV}$ and by delaying the output signal.

Converters with self-oscillating control circuits are also known, which allow for a regulation of the output voltage. However, these converters impose a measurement of the voltage at the transformer secondary and, accordingly, a galvanic isolation element to transmit the measured value to the control circuit. This considerably increases the cost and is an often crippling disadvantage of this type of converter.

A converter with a self-oscillating control circuit is thus conventionally incompatible with a regulation of output voltage $V_{out}$, while maintaining a low cost.

SUMMARY OF THE INVENTION

The present invention aims at providing a novel converter of switched-mode power supply type with a self-oscillating control circuit, which allows for a regulation of the output voltage without requiring use of a galvanic isolation element between the transformer secondary and the control circuit. The present invention more specifically aims at providing a solution that respects the conventional structure with an RS flip-flop or the like of a self-oscillating converter.

The present invention also aims at providing a solution which is compatible with a protection of the converter against a short-circuit at the secondary, still without any galvanic isolation element.

The present invention further aims at providing a solution with an integrable control circuit.

To achieve these objects, the present invention provides a voltage converter including a transformer having a primary winding connected in series with a switch for cutting-up a supply voltage and having a secondary winding associated with a capacitor providing a low D.C. voltage, and a self-oscillating control circuit of the switch including means for detecting the end of the demagnetization of an auxiliary winding of the transformer, to turn the switch on, and means for detecting the current in the on-state switch to turn it off when this current reaches a reference point, and means for making the reference point variable according to the voltage across the auxiliary winding.

According to an embodiment of the present invention, the converter includes means for decreasing the conduction time of the switch when the voltage across the auxiliary winding leaves a predetermined range of values.

According to an embodiment of the present invention, said reference point is decreased when the voltage across the auxiliary winding comes out of said range of values.

According to an embodiment of the present invention, the converter includes means for inhibiting the means for making the reference point variable in a starting phase where the voltage provided by the converter has not reached a minimum regulation value yet.

According to an embodiment of the present invention, the converter includes a variable voltage generator providing the reference point on an input of a first comparator, the other input of which receives a voltage which is a function of the current in the switch, the output of the first comparator turning the switch off.

According to an embodiment of the present invention, the variable voltage generator includes a first analog error amplifier receiving a measured voltage proportional to the voltage across the auxiliary winding and providing a voltage proportional to the positive difference between the measured voltage and a first predetermined threshold, and a second analog error amplifier receiving said measured voltage and providing a voltage proportional to the positive difference between a second predetermined threshold and the measured voltage, the second threshold being lower than the first threshold.

According to an embodiment of the present invention, the results of the two error amplifiers are summed up to provide a control signal of a variable current source.

According to an embodiment of the present invention, the variable current source provides, in the absence of a correction by one of the error amplifiers, a predetermined nominal voltage.

According to an embodiment of the present invention, the converter includes means for inhibiting the operation of the second error amplifier as long as a local supply voltage of the control circuit has not reached a predetermined value.

According to an embodiment of the present invention, the analog error amplifiers are hysteresis amplifiers.

The foregoing objects, features and advantages of the present invention, will be discussed in detail in the following non-limiting description of specific embodiments in connection with the accompanying drawings.

BRIEF DESCRIPTION OF THE DRAWINGS

FIGS. 5A to 5G illustrate, in the form of timing diagrams, the operation of a converter according to the present invention.

DETAILED DESCRIPTION OF THE INVENTION

Figure 1:
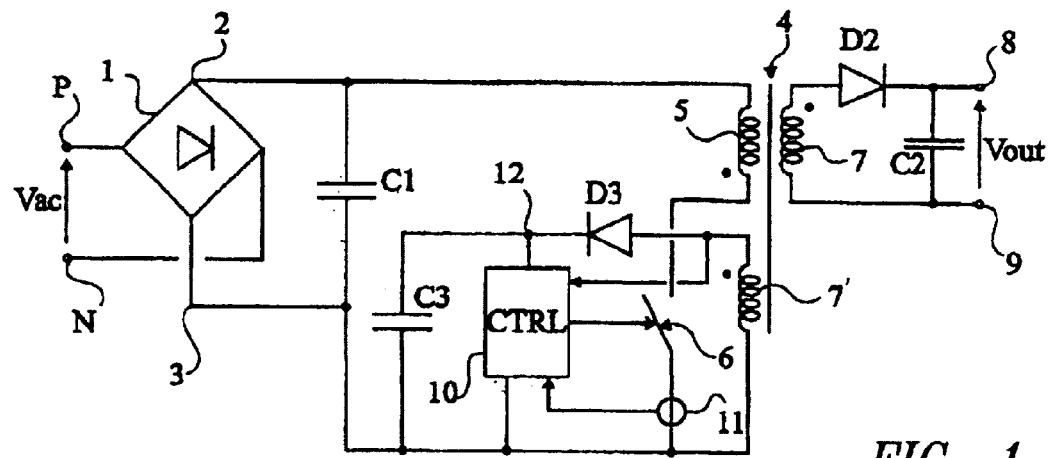
FIGS. 1 and 2, previously described, are intended for showing the state of the art and the problem to solve.

The same elements have been designated with the same references in the different drawings. The timing diagrams of FIG. 5 are not to scale. For clarity, only those elements of a voltage converter which are useful to the understanding of the present invention have been shown in the drawings and will be described hereafter. In particular, the structures of the fixed reference voltage generation circuits, of the drivers, of the comparators, and of the flip-flop have not been detailed and are no object of the present invention.

A feature of the present invention is to use an image of the voltage across the secondary winding providing the output voltage to modulate the reference voltage of the comparator conditioning the duration of the on state of the switch. In other words, it is provided to make the reference voltage used to turn the supply voltage switch on variable, and to make this variation a function of the output voltage. A regulation of this output voltage is thus obtained.

To protect the converter against overloads or a short-circuit of the secondary, another feature of the present invention is to provide a voltage regulation (maintaining of an approximately constant voltage) as long as an overload has not been detected, and a current regulation (maintaining of an approximately constant current) when an overload is detected. For this purpose, the voltage across the auxiliary winding is monitored with respect to two thresholds surrounding a desired nominal voltage and it is ensured that the voltage remains between the two thresholds. A first threshold corresponds to a maximum voltage value in normal operation. A second threshold (lower than the first one) translates too strong a current surge (drop in the output voltage). Between the two thresholds, the switching frequency is not modified and the variable reference voltage is maintained at a nominal value.

Another feature of the present invention is to obtain the image of the output voltage without using any additional galvanic isolation means. For this purpose, advantage is taken of the existence of the auxiliary winding used for the local supply of the switch control circuit. The voltage across the auxiliary winding which, to implement the present invention, is in direct phase relation with the secondary winding, gives an image of the output voltage.

Figure 2:
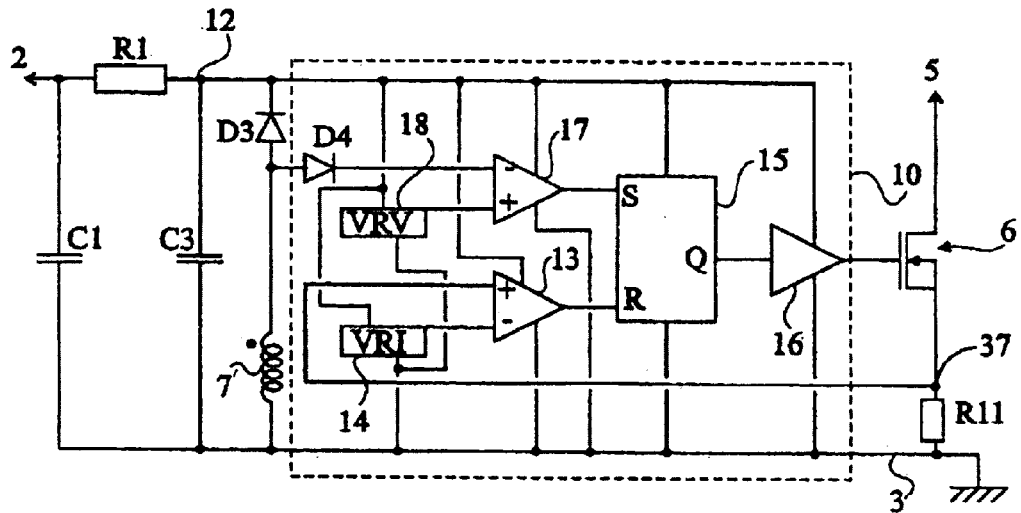
Figure 3:
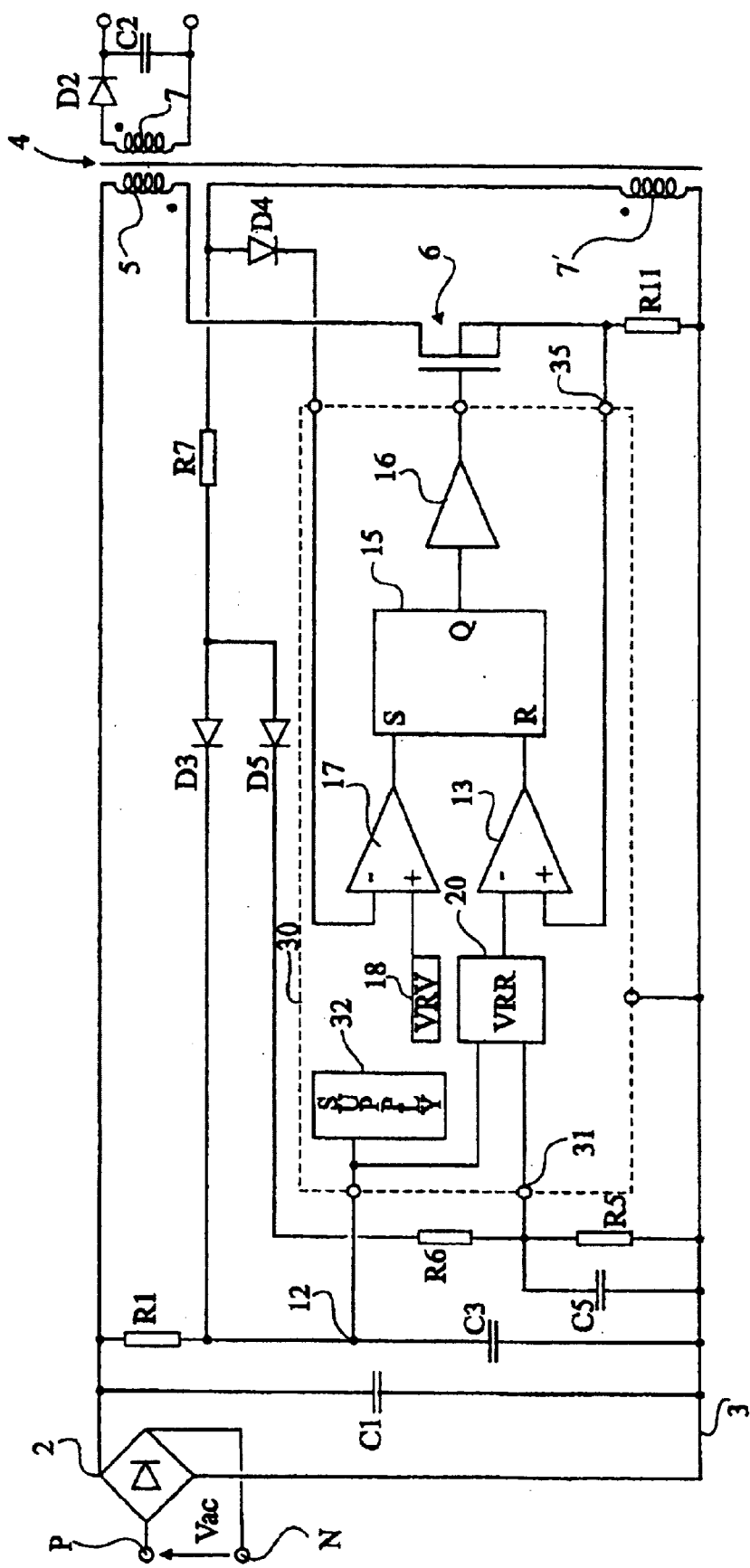
FIG. 3 shows an embodiment of a converter according to the present invention.

FIG. 3 shows an embodiment of a voltage converter according to the present invention. This drawing should be compared with FIG. 2 and illustrates the modifications to be brought with respect to the conventional converter.

As previously, a switch 6 (for example, an N-channel MOS transistor) for cutting up a supply voltage is connected in series with a primary winding 5 of a transformer 4. A secondary winding 7 of transformer 4 charges a capacitor C2 via a diode D2, output voltage $V_{out}$ being sampled across capacitor C2. Windings 5 and 7 have inverted phase points. Switch 6 is controlled by the output (Q) of an RS flip-flop 15 (in practice, through a driver 16) of a control circuit 30. The set input (S) of flip-flop 15 is controlled by a comparator 17 detecting the demagnetization across an auxiliary winding 7' of the transformer. A diode D4 connects the phase point of winding 7' to the negative terminal of comparator 17. The positive terminal of comparator 17 receives a fixed voltage reference $V_{RV}$, provided by an element 18. A capacitor C3 provides a local supply voltage $V_{dd}$ of control circuit 30. Electrode 12 of capacitor C3 is connected, by a diode D3 in series with a resistor R7, to the phase point of winding 7' and, by a resistor R1, to positive terminal 2 of application of the voltage to be cut-up. For example, this voltage corresponds to a rectified voltage provided by a diode bridge 1 supplied by an A.C. voltage $V_{ac}$. A capacitor C1 connects rectified output terminal 2 of bridge 1 to a ground terminal 3 for smoothing the rectified voltage.

Reset input R of flip-flop 15 is connected at the output of a comparator 13, the positive input of which receives a measurement of the current in switch 6. For example, the positive input of comparator 13 is connected to an input terminal 35 of circuit 30, which measures a voltage depending on the current in switch 6. A resistor R11 is used, conventionally, as a current-to-voltage converter.

According to the present invention, the negative input of comparator 13 receives a variable voltage reference $V_{RR}$ provided by a generator 20. Functionally, the essential modification to be brought to the circuit of FIG. 2 to implement the present invention is to replace the fixed voltage reference generator (14, FIG. 2), at the input of the reset comparator of the RS flip-flop, by generator 20.

The function of generator 20 is to decrease reference voltage $V_{RR}$ when the output voltage of the converter leaves a predetermined regulation range. This causes a decrease in the conduction time of switch 6, which results in a decrease in the power stored by the transformer. This results in an increase in the frequency of the self-oscillating system and, accordingly, a decrease in the power provided to the transformer secondary. If the output voltage increases, this implies a decrease in the current surged by the load and the regulation performed by the present invention minimizes the consumption while avoiding the occurrence of prejudicial overvoltages at the load level. If the output voltage decreases, this means the presence of an overload, or even of a short-circuit. The converter must thus be protected by decreasing this current. Generator 20 of the present invention must however be compatible with the circuit operation at the starting where the output voltage is initially null. As will be seen hereafter, the present invention provides inhibiting the regulation at the system starting. A nominal voltage $V_{NOM}$ is generated for generator 20 and this value is not modified as long as the output voltage has not reached a minimum regulation voltage.

In practice, a voltage $V_{AUX}$ proportional to the voltage across auxiliary winding 7' is sampled. Voltage $V_{AUX}$ is sampled on an input terminal 31 of circuit 30. According to the present invention, terminal 31 is connected to a first electrode of a capacitor C5 having its other electrode connected to ground. Terminal 31 is also connected to the midpoint of a resistive voltage dividing bridge. This bridge is formed of a resistor R5 in series with a resistor R6 between ground 3 and the cathode of a diode D5 having its anode connected to the anode of diode D3. Further, a resistor R7 connects the anodes of diodes D3 and D5 to the phase point of winding 7'. Voltage $V_{AUX}$ is a function of the transformation ratio between auxiliary winding 7' and secondary winding 7, as well as of the values of resistors R5, R6, and R7. More specifically, neglecting the voltage drop in diode D5, voltage $V_{AUX}$ corresponds to the voltage across winding 7', assigned with the proportionality coefficient set by the resistive bridge formed on the one hand of resistors R7 and R6 in series and on the other hand of resistor R5.

Resistor R1 associated with capacitor C3 is used, as previously, for the circuit starting. In addition to its rectifying function, diode D3 is used to protect the measurement circuit from the starting circuit (R1, C3) to avoid voltage $V_{AUX}$ being influenced by the voltage at the transformer primary. Capacitor C5 is used to damp the variations of voltage $V_{AUX}$.

In the representation of FIG. 3, circuit 30 is shown in the form of an integrated circuit delimited by dotted lines gathering all regulation functions of the present invention.

The switching frequency of a converter according to the present invention depends on the duration during which switch 6 is on and on the demagnetization duration of the auxiliary winding (and thus of the secondary winding). The on-state duration of switch 6 depends on the input voltage (voltage across capacitor C1), on the amplitude of the current in switch 6 and on the inductance of primary winding 5 of the transformer. The amplitude of the current in switch 6 corresponds to variable reference voltage $V_{RR}$ divided by resistance R11. The off-state duration of transistor 6 depends on the demagnetization duration of the secondary and auxiliary windings and, accordingly, essentially on the coupling of transformer 4.

Figure 4:
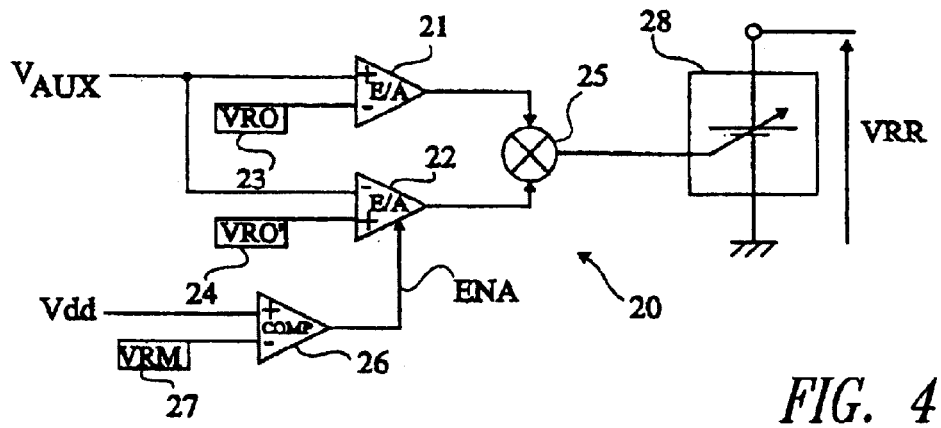
FIG. 4 schematically shows an embodiment of a variable reference generator of a converter according to the present invention.

FIG. 4 shows an embodiment of a variable reference voltage generator 20 according to the present invention. Such a generator is intended for being implanted in a voltage converter of the type illustrated in FIG. 3.

In the example of FIG. 4, generator 20 includes a first error amplifier 21 (E/A), a first (positive) input of which receives a voltage $V_{AUX}$ proportional to the voltage across the auxiliary winding of the transformer. A negative input of error amplifier 21 receives a fixed reference voltage $V_{R0}$ provided by a voltage generation element 23. A second error amplifier 22 (E/A) receives, on its negative input, voltage $V_{AUX}$ and, on its positive input, a fixed reference voltage $V_{R0}'$ provided by a voltage generation element 24. According to the present invention, the voltage references of error amplifiers 21 and 22 are different and condition the regulation range, that is, an output voltage range where the switching frequency is not modified.

The outputs of amplifiers 21 and 22 are combined in an adder 25, the output of which controls a variable voltage source 28. Source 28 provides variable reference voltage $V_{RR}$. Source 28 is sized so that, in the quiescent state, it provides a predetermined nominal reference voltage $V_{NOM}$, which is a function of the nominal output voltage for which the converter is designed. To enable the circuit starting, error amplifier 22 is activated by means of a signal ENA provided by a comparator 26 (COMP). A positive input of the comparator receives local supply voltage $V_{dd}$ of the control circuit (not shown in FIG. 4). A negative input of comparator 26 receives a fixed voltage reference $V_{RM}$, corresponding to a level under which the circuit is considered to be in a starting phase. Voltage $V_{RM}$ conditions the minimum regulation value. Functionally, comparator 26 is used to invalidate error amplifier 22 as long as the local supply voltage is not sufficient, and thus in particular in the converter starting phase. Signal ENA masking the results of error amplifier 22 is obtained by comparing voltage $V_{dd}$ across capacitor C3 with the threshold $V_{RM}$ provided by an element 27.

Error amplifiers 21 and 22 are analog amplifiers which thus provide a signal which is a function of the amplitude of the difference between their respective inputs. Conversely, comparator 26 is a digital comparator providing a high or low output state according to whether voltage $V_{dd}$ is greater or smaller than reference $V_{RM}$. Given the biasing of the error amplifier inputs, amplifier 21 provides the difference between voltage $V_{AUX}$ and reference $V_{R0}$, and amplifier 22 provides the difference between reference $V_{R0}'$ and voltage $V_{AUX}$. Only positive differences are taken into account. In other words, the output voltage is regulated to be brought back into a regulation range where it is considered to correspond to its nominal value. As long as the output voltage remains greater than the value conditioned by reference $V_{R0}'$, it can be considered that a voltage regulation is performed and the output voltage is brought back into the regulation range if it exceeds the upper limit. If the voltage drops under the value conditioned by reference $V_{R0}'$, it can be considered that a regulation of the current, which is maintained to a limiting (maximum) value, is performed, while attempting to bring the output voltage back into the regulation range.

The different fixed voltage references ($V_{RV}$, $V_{RI}$, $V_{R0}$, $V_{R0}'$, $V_{RM}$) are provided by conventional means. For example, a circuit 32 (SUPPLY, FIG. 2) providing the supply voltages of the different elements of circuit 30 based on a voltage reference of "bandgap" type may be used. The structure of such a circuit is conventional and is no object of the present invention.

FIGS. 5A to 5G illustrate, in the form of timing diagrams, an example of operation of a converter equipped with variable voltage generator 20 of FIG. 4 in four operating phases. FIG. 5A shows an example of voltage $V_{dd}$. FIG. 5B shows signal ENA provided by comparator 26. FIG. 5C shows voltage $V_{AUX}$. FIG. 5D shows voltage $V_{21}$ at the output of amplifier 21. FIG. 5E shows voltage $V_{22}$ at the output of amplifier 22. FIG. 5F shows voltage $V_{25}$ at the output of adder 25. FIG. 5G shows variable reference voltage $V_{RR}$.

A first phase A illustrated by FIG. 5 corresponds to the converter starting phase. Initially, voltage $V_{dd}$ is assumed to be null, capacitor C3 (providing the local power supply) being integrally discharged. As long as voltage $V_{dd}$ has not reached a minimum level $V_{MIN}$ (time t1), the control circuit is not supplied and no voltage reference can be generated. As a result, the output signal of the different error amplifiers, as well as control signal $V_{25}$ of voltage $V_{RR}$, are null. From time t1 on, it becomes possible to detect voltage $V_{AUX}$, which starts increasing along switching cycles of the supply voltage. Variable reference voltage $V_{RR}$ starts increasing from time t1, following the increase of the local supply voltage. As for amplifier 21, its output remains null as long as voltage $V_{AUX}$ does not exceed fixed reference $V_{R0}$. Fixed reference $V_{R0}$ is sized according to the maximum output operating voltage desired for the converter. As for amplifier 22, its output is invalidated until a time t2 where voltage $V_{dd}$ reaches threshold $V_{RM}$ and where signal ENA switches high. Between times t1 and t2, with no invalidation by signal ENA, the output of error amplifier 22 would tend to provide an inverse signal with respect to the increase of voltage $V_{AUX}$, as illustrated by the dotted lines in FIG. 5E. At time t2, a nominal converter operation state is reached. Voltage $V_{dd}$ increases to reach a limiting value $V_{LIM}$, set by elements external to the variable reference generator. Voltage $V_{AUX}$ reaches threshold $V_{R0}$ substantially at the time (t3) when voltage $V_{dd}$ reaches its limiting value.

In practice, error amplifiers 21 and 22 are hysteresis amplifiers. Accordingly, threshold $V_{R0}$ will be reached by auxiliary voltage $V_{AUX}$ before voltage $V_{dd}$ reaches its limiting value, and threshold $V_{R0}'$ will preferably be reached before voltage $V_{dd}$ reaches value $V_{RM}$.

As long as the auxiliary voltage remains in the range set by thresholds $V_{R0}$ and $V_{R0}'$, the outputs of error amplifiers 21 and 22, as well as the output of adder 25, remain null. Output voltage $V_{RR}$ of the generator then remains at its nominal level $V_{NOM}$, set by sizing of the different components (phase B). The advantage of having hysteresis error amplifiers to avoid for the outputs of amplifiers 21 and 22 to start oscillating in a nominal operating phase. The choice of values $V_{R0}$ and $V_{R0}'$ depends on the precision desired for the regulation.

Nominal phase B continues until a time t4 where the occurrence of an overvoltage at the output is assumed (phase C). Such an overvoltage corresponds, for example, to a decrease in the current surged by the load supplied by the converter. Voltage $V_{AUX}$ starts increasing at the same time as the output voltage. From a time t5 representing the hysteresis of error amplifier 21, voltage $V_{21}$ starts increasing, following the increase of voltage $V_{AUX}$. This results in a signal corresponding to the level of the output of adder 25. Signal $V_{25}$ then causes a decrease in reference voltage $V_{RR}$ in an inversely proportional manner. This decrease in the variable reference voltage acts upon the occurrence of the turn-off edges of switch 6. Accordingly, the decrease in the conduction time of switch 6 causes a decrease in the output voltage, which appears on the courses of signals $V_{AUX}$, $V_{21}$, and $V_{25}$. A nominal state is finally recovered from a time t6. Phase C corresponds to a voltage regulation.

Between times t7 and t8 (phase D), the occurrence of an undervoltage corresponding to an overload at the converter output is considered. At a time t9, voltage $V_{AUX}$ becomes smaller than threshold $V_{R0}'$. This results in an increase in voltage $V_{22}$ of error amplifier 22. This increase in voltage $V_{22}$ is transferred to the output of adder 25. As in the case of an overvoltage, this causes a decrease in variable reference voltage $V_{RR}$. As previously, this decrease in the reference voltage causes a decrease in the conduction time, which enables decreasing the amount of power transmitted to the secondary. This operating mode can also correspond to the case of a short-circuit at the converter output. Be it an overload or a short-circuit, the current surge of the load is considered as exceeding the limiting value for which the circuit is designed. Accordingly, the amount of provided power is decreased to protect the converter. Phase D corresponds to a current regulation.

An advantage of the present invention is that while maintaining the operation of a self-oscillating control circuit of a voltage converter, a regulation of the output voltage with respect to a desired nominal value and a constant current overload protection are obtained. The nominal value of the output voltage is a function of nominal value $V_{NOM}$ of voltage $V_{RR}$.

Another advantage of the present invention is that it requires no measurement at the transformer secondary, and no galvanic isolation means for transferring a measurement result.

As compared to a converter of pulsewidth modulation type where the current measurement in switch 6 is used to vary the reference of a comparator exploiting an information linked to voltage $V_{AUX}$, the present invention uses voltage $V_{AUX}$ to vary the reference of a comparator exploiting an information linked to the current in the switch.

Of course, the present invention is likely to have various alterations, modifications, and improvements which will readily occur to those skilled in the art. In particular, the hysteresis of analog error amplifiers 21 and 22 will be adapted according to the desired and/or necessary stability for the control signal of variable voltage source 28. Further, the values of the resistances and of the capacitances conditioning the operating frequency and voltages of the self-oscillating converter of the present invention depend on the application and are within the abilities of those skilled in the art based on the functional indications given hereabove. Preferably, the switching frequency will be of several kHz (preferably greater than 20 kHz to be non-audible), and thus much greater than the frequency of voltage Vac if the mains is involved. Typically, a converter of the present invention is intended for output voltages ranging between a few volts and a few tens of volts for powers ranging from a few watts to a few tens of watts. Further, the implementation of the present invention does not discard the use of trigger elements and of a delay element at the output of the demagnetization comparator, as is the case for a conventional converter.

Such alterations, modifications, and improvements are intended to be part of this disclosure, and are intended to be within the spirit and the scope of the present invention. Accordingly, the foregoing description is by way of example only and only as defined in the following claims and the equivalents is not intended to be limiting. The present invention is limited thereto.

What is claimed is:

1. A voltage converter comprising:
   a transformer having a primary winding connected in series with a switch for cutting-up a supply voltage and having a secondary winding associated with a capacitor providing a low D.C. voltage;
   a self-oscillating control circuit of the switch including:
      means for detecting an end of a demagnetization of an auxiliary winding of the transformer, to turn the switch on;
      means for detecting a current in an on-state of the switch, and turning the switch off when the current reaches a reference point; and
      means for making the reference point variable according to a voltage across the auxiliary winding.

2. The converter of claim 1, including means for decreasing a conduction time of the switch when the voltage across the auxiliary winding leaves a predetermined range of values.

3. The converter of claim 2, wherein said reference point is decreased when the voltage across the auxiliary winding comes out of said range of values.

4. The converter of claim 1, including means for inhibiting the means for making the reference point variable in a starting phase where the voltage provided by the converter has not reached a minimum regulation value yet.

5. The converter of claim 1, including a variable voltage generator providing the reference point on a first input of a comparator having a second input that receives a voltage which is a function of the current in the switch, an output of the comparator turning the switch off.

6. The converter of claim 5, wherein the variable voltage generator includes:
   an analog first error amplifier receiving a measured voltage proportional to the voltage across the auxiliary winding and providing a voltage proportional to the positive difference between the measured voltage and a predetermined first threshold; and
   an analog second error amplifier receiving said measured voltage and providing a voltage proportional to the positive difference between a predetermined second threshold and the measured voltage, the second threshold being lower than the first threshold.

7. The converter of claim 6, wherein the results of the two error amplifiers are summed up to provide a control signal of a variable current source.

8. The converter of claim 7, wherein the variable current source provides, in the absence of a correction by one of the error amplifiers, a predetermined nominal voltage.

9. The converter of claim 6, including means for inhibiting the operation of the second error amplifier as long as a local supply voltage of the control circuit has not reached a predetermined value.

10. The voltage converter of claim 6, wherein the error amplifiers are hysteresis amplifiers.

11. A method, comprising:
   detecting a current level in a primary winding of a transformer, a secondary winding of which is associated with a rectifier to provide a D.C. voltage;

opening a switch when the current level reaches a first reference point, wherein the switch is connected in series with the primary winding;

detecting a level of magnetization in an auxiliary winding of the transformer;

closing the switch when the level of magnetization is less than a second reference point; and varying the first reference point according to a voltage level across the auxiliary winding.

12. The method of claim 11, wherein the voltage level is a rectified and filtered voltage level.

13. The method of claim 11, wherein the varying step results in decreasing a conduction period of the primary winding when the voltage level departs from a range of values.

14. The method of claim 11, further including the step of suspending the varying step during a startup period, until the voltage level exceeds a startup reference point.

15. A device comprising:
- a transformer having a primary winding, a secondary winding and an auxiliary winding;
- a switch having a control terminal, connected in series with the primary winding;
- a control circuit having an output terminal connected to the control terminal of the switch, the control circuit including:
  - a flip-flop having first and second inputs and an output comprising the output terminal of the control circuit;
  - a comparator having first and second inputs and an output connected to the first flip-flop input;
  - a variable voltage reference generator having an output connected to the first input of the comparator, the generator configured to monitor a filtered and rectified output level of the auxiliary winding and to decrease a reference voltage present at the first input of the first comparator when the output level of the auxiliary winding leaves a preset range;
  - a current to voltage converter configured to provide a voltage level at the second input of the first comparator proportionate to a current present in the primary winding; and
  - a circuit configured to provide a logic level at an output indicating the presence or absence of a magnetic charge in the auxiliary winding, the output being connected to the second input of the flip-flop.

16. The device of claim 15, wherein the first flip-flop input is a reset terminal and the second flip-flop input is a set terminal.

17. The device of claim 15, wherein the variable voltage reference generator maintains a constant reference voltage at its output during a startup period, which ends when the output level of the auxiliary winding exceeds a startup reference level.

* * * * *